US009427683B2

(12) United States Patent
Larsson et al.

(10) Patent No.: US 9,427,683 B2
(45) Date of Patent: Aug. 30, 2016

(54) FILTER DEVICE AND FUEL DISPENSING SYSTEM COMPRISED THEREOF

(71) Applicant: Wayne Fueling Systems LLC, Austin, TX (US)

(72) Inventors: Bengt Ingemar Larsson, Malmo (SE); James David Dirocco, Jr., Austin, TX (US)

(73) Assignee: Wayne Fueling Systems LLC, Austin, TX (US)

(*) Notice: Subject to any disclaimer, the term of this patent is extended or adjusted under 35 U.S.C. 154(b) by 473 days.

(21) Appl. No.: 13/743,121

(22) Filed: Jan. 16, 2013

(65) Prior Publication Data

US 2014/0069851 A1 Mar. 13, 2014

Related U.S. Application Data

(60) Provisional application No. 61/699,165, filed on Sep. 10, 2012.

(51) Int. Cl.
| | | |
|---|---|---|
| *B01D 35/00* | (2006.01) | |
| *B01D 24/00* | (2006.01) | |
| *B01D 27/00* | (2006.01) | |
| *B67D 7/76* | (2010.01) | |
| *B01D 35/143* | (2006.01) | |
| *B01D 29/23* | (2006.01) | |
| *B01D 46/42* | (2006.01) | |

(52) U.S. Cl.
CPC ............ *B01D 35/005* (2013.01); *B01D 29/23* (2013.01); *B01D 35/143* (2013.01); *B01D 46/4254* (2013.01); *B67D 7/76* (2013.01); *B01D 2201/309* (2013.01)

(58) Field of Classification Search
None
See application file for complete search history.

(56) References Cited

U.S. PATENT DOCUMENTS

| | | | |
|---|---|---|---|
| 1,366,760 | A | 1/1921 | Zimmerman |
| 2,757,798 | A | 8/1956 | Jordan |
| 4,033,880 | A | 7/1977 | Bengtsson |
| 4,759,842 | A | 7/1988 | Frees et al. |
| 5,378,358 | A * | 1/1995 | Park ............................. 210/187 |

(Continued)

FOREIGN PATENT DOCUMENTS

| | | |
|---|---|---|
| CN | 101456639 | 6/2009 |
| CN | 201755443 | 3/2011 |

(Continued)

OTHER PUBLICATIONS

PCT Search Report and Written Opinion dated Nov. 29, 2013 from corresponding Application No. PCT/US2013/058949.

*Primary Examiner* — Nam Nguyen
*Assistant Examiner* — Richard Gurtowski
(74) *Attorney, Agent, or Firm* — Mintz Levin Cohn Ferris Glovsky and Popeo, P.C.

(57) ABSTRACT

Embodiments of a filter device for use in fuel dispensing systems can comprise an inspection element that permits visual observation of fuel that flows inside of the system. The filter device can include a body with a wall that forms a filter chamber. The wall can have one or more apertures that couple with a fuel inlet and a fuel outlet to allow fuel to flow into and about the filter chamber. In one embodiment, the body includes a boss member with a bore that penetrates the wall to expose the filter chamber. The inspection element includes an optical element that fits within the bore and a retaining element that secures to the boss member to retain the optical element therein.

9 Claims, 7 Drawing Sheets

(56) References Cited

U.S. PATENT DOCUMENTS

| | | | |
|---|---|---|---|
| 5,766,449 A | | 6/1998 | Davis |
| 5,837,132 A | * | 11/1998 | Hurner ............... 210/95 |
| 6,083,381 A | | 7/2000 | Connelly et al. |
| 6,569,320 B1 | | 5/2003 | Bedi et al. |
| 7,182,855 B1 | | 2/2007 | O'Leary |
| 2004/0084027 A1 | * | 5/2004 | Grant ............ F02M 59/022 123/447 |
| 2009/0184041 A1 | | 7/2009 | Hoverson et al. |

FOREIGN PATENT DOCUMENTS

| | | |
|---|---|---|
| DE | 3248720 A1 | 7/1984 |
| EP | 0309743 | 4/1989 |
| EP | 2495026 A1 | 9/2012 |
| KR | 19970062356 | 9/1997 |
| KR | 19980016478 | 6/1998 |
| WO | 2007055483 A1 | 5/2007 |

* cited by examiner

FILTER DEVICE AND FUEL DISPENSING SYSTEM COMPRISED THEREOF

CROSS-REFERENCE TO RELATED APPLICATIONS

This application claims the benefit of priority to U.S. Provisional Patent Application Ser. No. 61/699,165, filed on Sep. 10, 2012 and entitled "Filter Device and Fuel Dispensing System comprised thereof," the content of which is incorporated in its entirety herein.

BACKGROUND

The subject matter disclosed herein relates to filters and filter devices for use in fuel dispensing systems.

Fuel dispensing systems transfer fluids (e.g., gasoline, diesel, etc.) from storage tanks to receptacles, e.g., a fuel can and/or fuel tank on a vehicle. These systems include a dispensing unit that, in some examples, incorporates a pump, a nozzle, one or more grade selectors, and payment components to complete transactions. During operation, an end user (e.g., a customer) interacts with the dispensing unit. This interaction can activate the pump to draw fuel from the storage tanks and to expel the fuel from the nozzle.

These systems are susceptible to failures, whether in connection with extended use and/or environmental conditions or due to assembly and part defects that occur during manufacturing, assembly, and installation of the system. The failures can result in leaks. These leaks can allow fuel and other effluent to leach into the environment that surrounds the dispensing system. This effluent can cause extensive environmental damage and result untold costs for clean-up, remediation, and potential fines.

Moreover, leaks can render the dispensing systems ineffective because of air that penetrates into the system during operation of the pump unit. The air mixes with the fuel. This resulting mixture can lead to inaccurate measurement of the amount of fuel that the system dispenses, e.g., to the end user. If left unrepaired, these problems can result in charges to the end user that are inaccurate (e.g., higher) that the actual amount of fuel the system dispenses.

Periodic inspection and maintenance of the fuel dispensing system can help to identify leaks. Conventional inspection techniques may utilize specially-designed pressure gauges and/or use cameras that provide images of components (e.g., pipes, valves, etc.) not readily available for visual inspection. These devices can help diagnose problems in the fuel dispensing system. However, to deploy these techniques, the system is likely shut-down and taken off-line. This situation can result in lost capacity and revenue because the fuel dispensing system is inoperable until the inspection is complete.

Other fuel dispensing systems may incorporate devices that offer in-situ leak detection during operation of the fuel dispensing systems. For example, nozzles may incorporate components that afford a visual inspection point for the technician. This feature, however, is typically not in position to indicate air penetration because the visual inspection point is downstream of air separators and/or other components that remove air from the fuel before the fuel reaches the nozzle. In other examples, the fuel dispensing system can include sensors that monitor properties of the fuel, e.g., pressure differentials that may indicate the presence of leaks. However, in many cases, leaks that occur in the fuel dispensing system are initially small and, thus, do not register pressure differentials that are within the measurement range of the corresponding sensor.

BRIEF SUMMARY OF THE INVENTION

This disclosure describes improvements to fuel dispensing systems to pre-emptively diagnose leaks in the system at initial stages, but without the need to take the dispensing system off-line. These improvements take advantage of fluid conditions (e.g., bubbles) that prevail in the presence of leaks and other failures that introduce air into the fuel. As set forth more below, the fuel systems of the present disclosure incorporate a filter device that is upstream, or on the suction side, of the pump unit. During operation, the pump unit activates to create a vacuum that draws fuel from a storage tank. The fuel passes through the filter device before entering the pump unit, after which the fuel flows to the nozzle for delivery to the end user. Examples of the filter device permit visual inspection of the fuel to identify the presence of bubbles and/or other changes in the levels of the fuel in the filter device.

BRIEF DESCRIPTION OF THE DRAWINGS

Reference is now made briefly to the accompanying figures, in which.

Where applicable like reference characters designate identical or corresponding components and units throughout the several views, which are not to scale unless otherwise indicated.

DETAILED DISCUSSION

Figure 1:
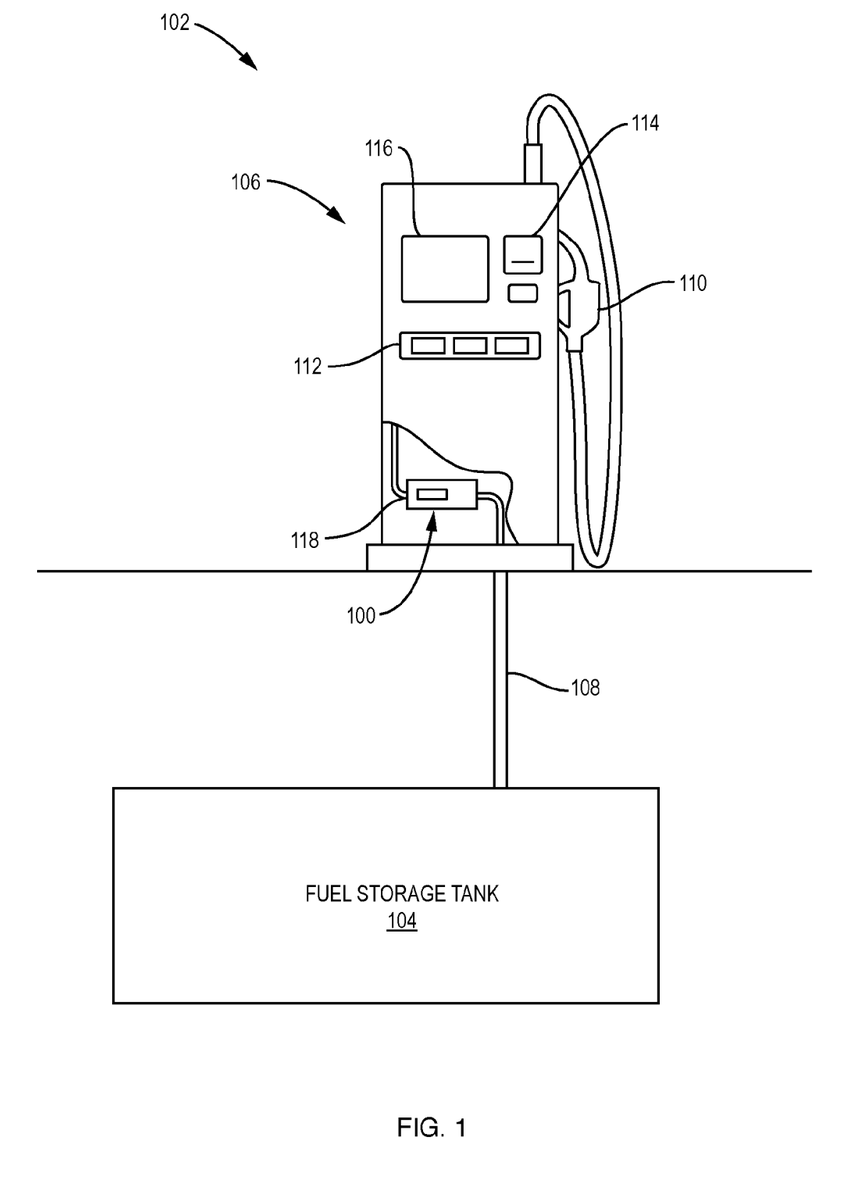
FIG. 1 depicts an exemplary embodiment of a filter device as part of a fuel dispensing system.

FIG. 1 depicts a schematic diagram to illustrate an exemplary embodiment of a filter device 100 of the present disclosure. The filter device 100 is part of a fuel dispensing system 102 (also "system 102") that includes a fuel storage tank 104 and a fuel dispenser unit 106. A pipe 108 places the fuel dispenser unit 106 in flow connection with the fuel storage tank 104. The fuel dispenser unit 106 includes a nozzle 110 and various control and operation elements (e.g., a grade selector 112, a display 114, and a payment device 116). The fuel dispenser 106 also includes a pump unit 118 that resides in a compartment of the dispenser unit 106. In one embodiment, the filter device 100 couples upstream of the pump unit 118. During operation, actuation of the nozzle 110 will cause the pump unit 118 to draw fluid from the fuel storage tank 104. The fuel enters the filter device 100, after which it flows to the nozzle 110 where the fuel dispenses, e.g., into the fuel tank of a vehicle.

Coupling the filter device 100 upstream of the pump unit 118 affords a convenient way for an end user (e.g., a technician) to check for leaks after installation of the system 102 and/or during scheduled and unscheduled maintenance and service work. Leaks can occur, for example, in and among the components and interconnections which form the fluid paths, e.g., from the storage tank 104 to the nozzle 110. These leaks can allow air to intrude into the fuel from outside the system 102 as the pump unit 118 builds vacuum in the fluid paths. Moreover, leaks can result in loss of vacuum in the fluid paths when the pump unit 118 is idle (e.g., not active between customers). This loss of vacuum during idle-time can extend the time necessary to dispense fuel, as the pump unit 118 will need to re-build lost pressure.

As set forth more below, designs for the filter device 100 incorporate features that provide a line-of-sight into the filter device 100. The line-of-sight exposes the interior of the filter device 100 to visually observe characteristics of the fuel that flows therein. These characteristics include the presence of bubbles in the fuel due to intruding air that is drawn into the fluid paths during operation of the pump unit 118. Although the size of the gas bubbles can vary, many of the gas bubbles are visible to the human eye. The characteristics also include the level of the fluid in the filter device 100. For example, loss of vacuum that results from leaks will present as a change in the level of the fluid in the filter device 100. In one example, the flow of fuel out of the system 102 can cause levels of fuel in the filter device 100 to change, e.g., from a first level to a second level that is less than the second level. The difference between the first level and the second level is visible to the human eye.

During maintenance, the technician removes one or more covers to expose the filter device 100 in the interior of the fuel dispenser 106. The technician can then observe the fuel in the filter device via the light-of-sight. The presence of bubbles in the fuel and/or a change in the fuel from the first level to the second level can prompt the technician to the presence of one or more leaks in the system 102 and to take appropriate measures to avoid further damage.

Figure 2:
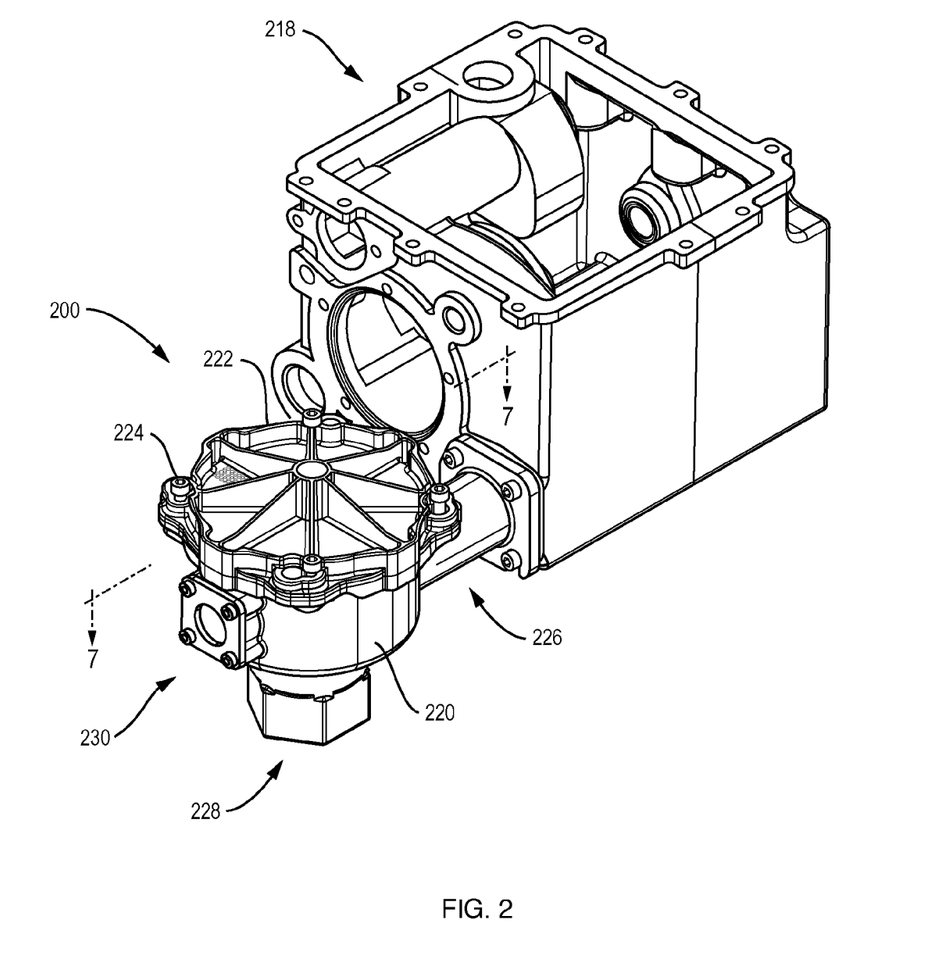
FIG. 2 depicts an exemplary embodiment of a filter device coupled with a pump unit that is part of a fuel dispensing system.

FIG. 2 illustrates a perspective view of an exemplary embodiment of a filter device 200 in one configuration that forms the line-of-sight to observe the characteristics of the fuel. The filter device 200 includes a filter housing 220 and a cover 222 that secures to the filter housing 220 using one or more fasteners 224. The filter housing 220 has a fuel outlet 226 and a fuel inlet 228 that allow fuel to enter and to exit the filter device 200, respectively. The fuel outlet 226 couples with the suction side of a manifold of the pump unit 218. The filter device 200 also includes an inspection element 230 that secures to the outside of the filter housing 220.

In one implementation, the orientation of the filter device 200 on the pump unit 218 locates the inspection element 230 in position for visual inspection, e.g., by an end user. This position may be located, for example, proximate an access panel and/or door on a fuel dispenser (e.g., fuel dispenser 106 of FIG. 1). The end user can remove this access panel and observe the fuel inside of the filter housing 220. During operation of the fuel dispenser, the pump unit 218 generates vacuum pressure that draws fuel into the filter housing 220 via the fuel inlet 228. The fuel passes through the filter housing 220, where components of the filter device 200 remove particulates and debris, and moves into the pump unit 218 via the fuel outlet 226. Any bubbles that form in the fuel due to leaks, as discussed above, will also transit into the filter housing 220 with the fuel. The inspection element 230 allows observation of characteristics of the fuel, e.g., to determine if any bubbles are present.

Figure 3:
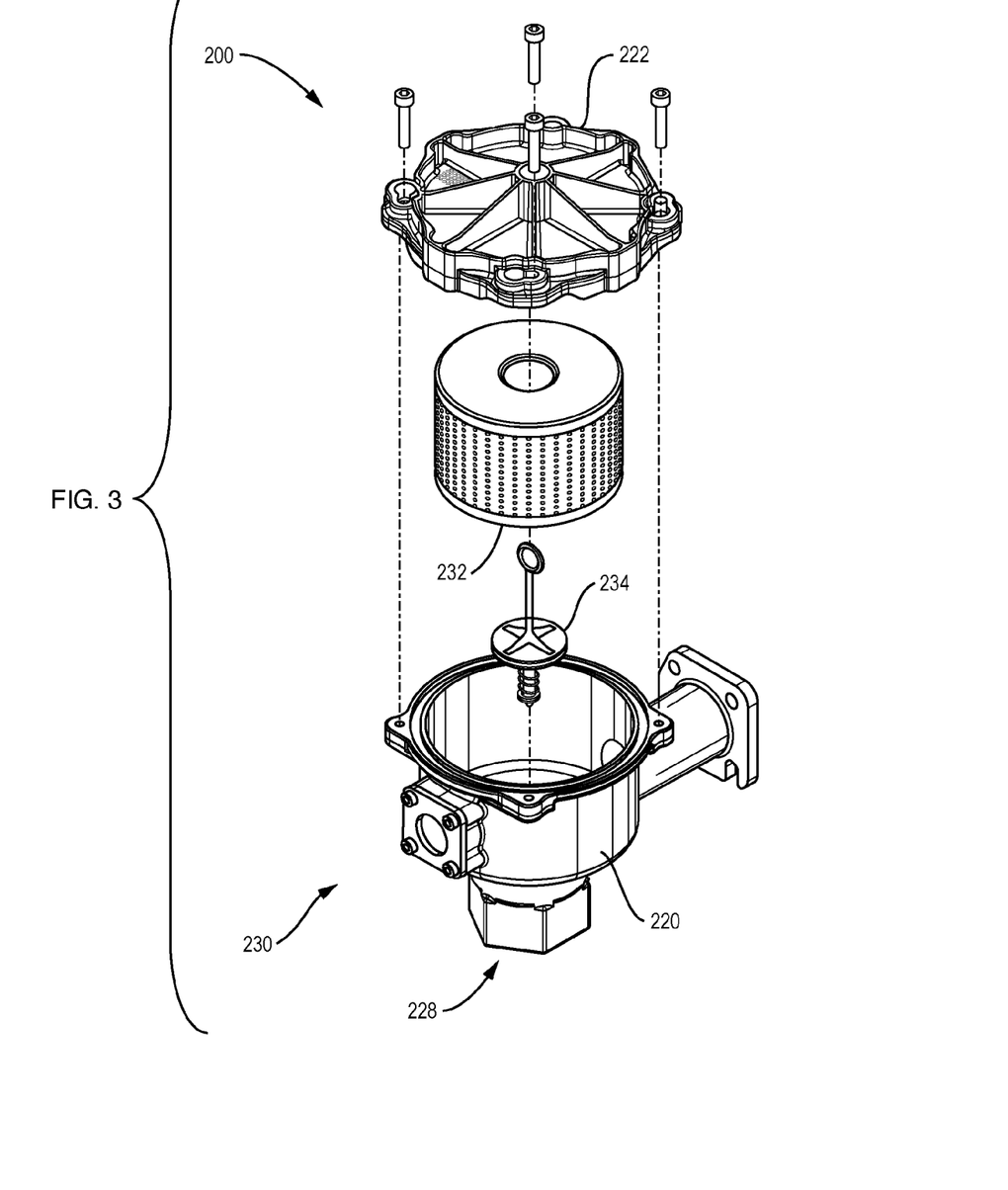
FIG. 3 depicts a perspective, exploded assembly of the filter device of FIG. 2.

FIG. 3 shows the filter device 200 of FIG. 2 in exploded form and with certain components removed for clarity. As shown in the example of FIG. 3, the filter device 200 includes one or more flow components (e.g., a filter assembly 232 and a valve assembly 234). The flow components 232, 234 install into the filter housing 220. The cover 222 and the inspection element 230 secure to the filter housing 220 to hermetically seal the interior of the filter housing 220. This hermetic seal maintains the pressure of the fuel during operation, e.g., of the pump unit 218 (FIG. 2).

The filter assembly 232 is configured to remove particles and debris including particles of dirt and metal precipitates that may travel in the flow of fuel. Examples of the filter assembly 232 can remove these particles, thus preventing them from moving out of the filter housing 220. This function is important as these particles, if large enough, may clog and damage components of a fuel dispenser (e.g., fuel dispenser 106 of FIG. 1) and/or reduce the accuracy of the meter that measures the amount of fuel that is dispensed, e.g., to a vehicle. Moreover, if transferred during filling, these particles may also clog and damage the fuel system and the engine components of the vehicle.

The valve assembly 234 prevents "fuel inlet draining," which can occur between operation of a fuel dispenser (e.g., fuel dispenser 106 of FIG. 1) to dispense fuel. Use of the valve assembly 234 can also reduce the risk of fuel system pressure drop. Fuel inlet pressure variations may cause accelerated wear of the dispenser components and may also cause flow rate variations during filling. Examples of the valve assembly 234 can incorporate structure (e.g., springs and resilient elements, one or more valve bodies that actuate, and seals and/or o-rings), the combination of which regulates ingress and egress of fuel into the filter housing 220. In one example, the valve assembly 234 comprises a valve that prevents flow of fuel in at least one direction, e.g., from the filter housing 220 and/or the pumping unit through the fuel inlet 228. This configuration maintains the vacuum pressure throughout the system.

Figure 4:
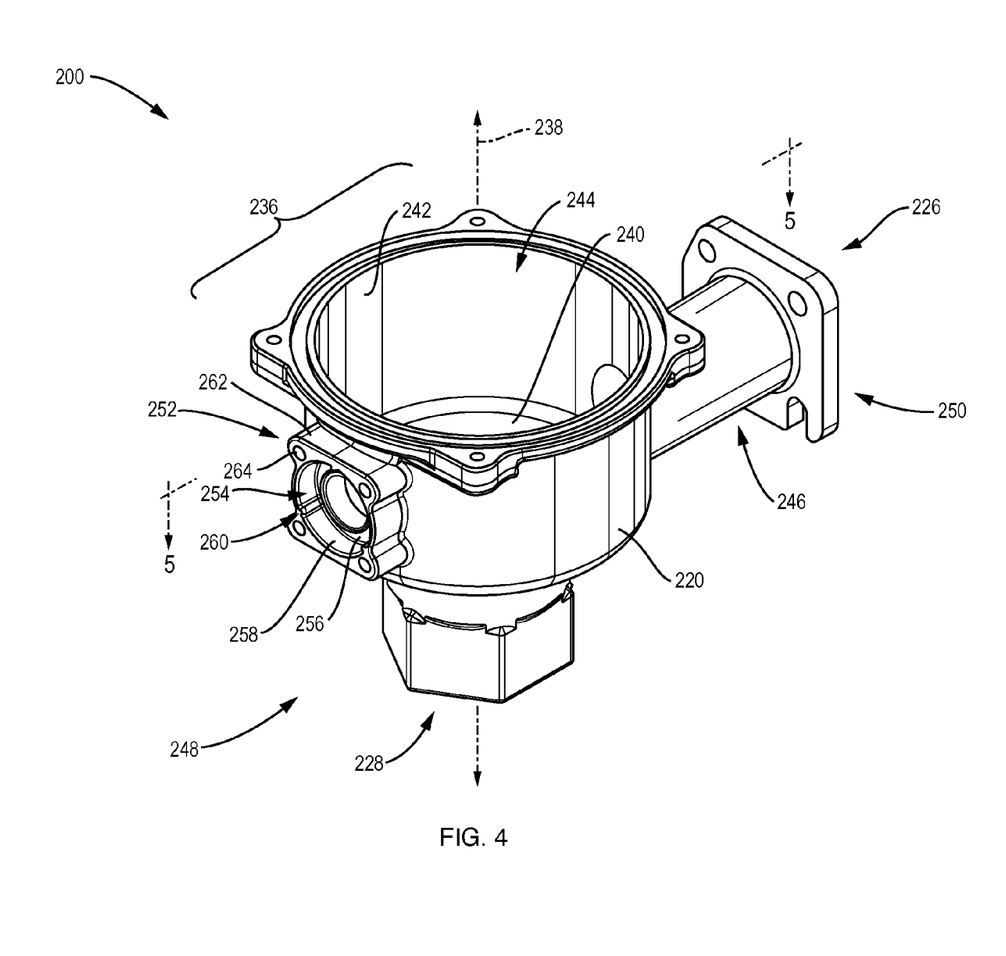
FIG. 4 depicts a perspective view of the filter housing found on the filter device of FIG. 2.
Figure 5:
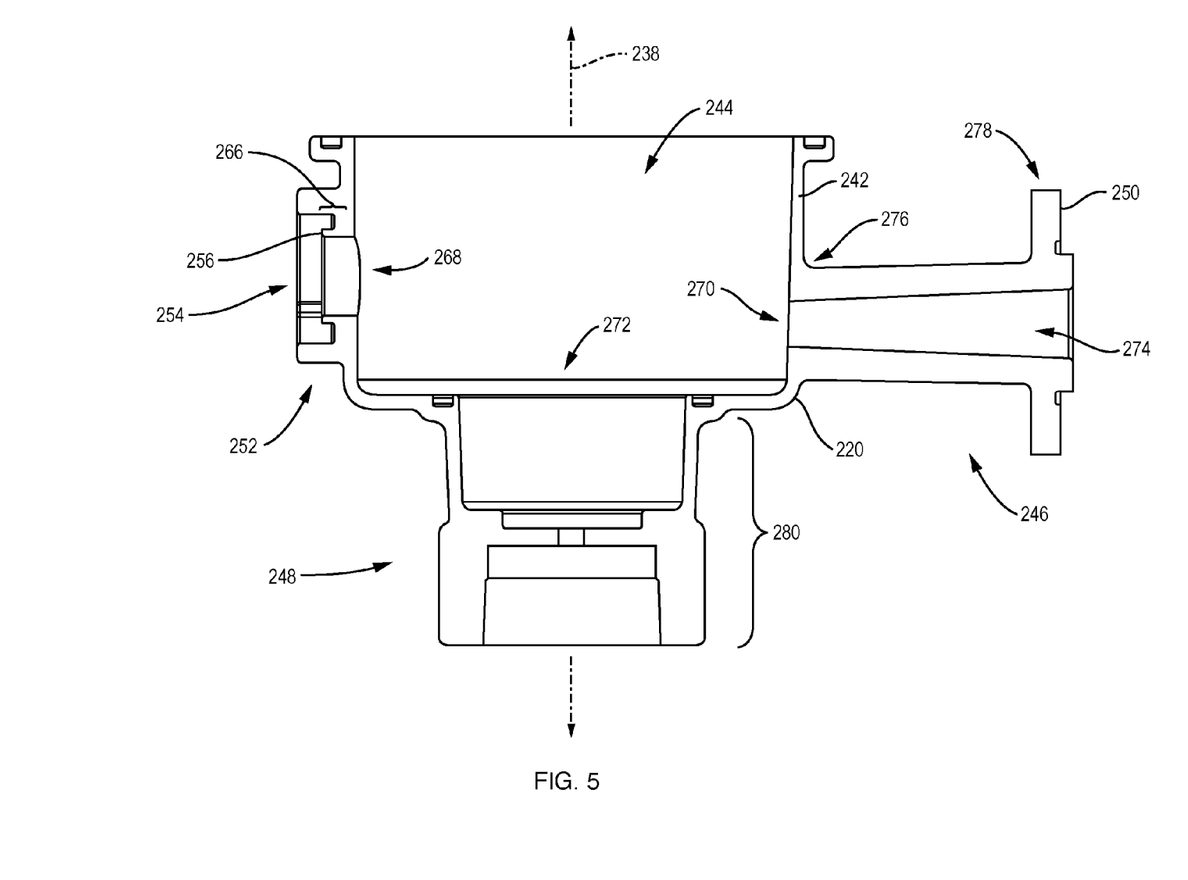
FIG. 5 depicts a side, cross-section view of the filter housing of FIG. 4.

FIGS. 4 and 5 illustrate the filter housing 220, with the remaining items of the filter 200 removed for clarity. In FIG. 4, the filter housing 220 has a cylindrical body member 236 with a center axis 238, a bottom 240, and a wall 242 circumscribing the center axis 238. The wall 242 forms a filter chamber 244 that can receive a filter assembly (e.g., filter assembly 232 of FIG. 3). In one example, the filter housing 220 also has a first tubular structure 246 and a second tubular structure 248 that correspond to, respectively, the fuel outlet 226 and the fuel inlet 228. The first tubular structure 246 has a mounting interface 250 at which the filter device 200 couples with a pumping unit (e.g., pumping unit 118 of FIG. 1).

As also shown in FIG. 4, the filter housing 220 has boss member 252 with a first bore 254 that forms an inner mating surface 256. The first bore 254 has an inner bore surface 258 with one or more standoff elements 260 spaced circumferentially thereon. The boss member 252 also has an outer mating surface 262 with one or more openings 264.

Examples of the filter housing 220 can incorporate various materials that are inert, or chemically-inactive, to fuel and other caustic fluids. These materials may be amenable to certain manufacturing techniques (e.g., molding and casting) that comport with cost and time criteria for one or more parts of the filter device 200 and fuel dispensers and system disclosed herein. One or more parts of the filter housing 220 may be formed monolithically and/or as a unitary structure, e.g., the body 236 forming each of the first tubular structure 246, the second tubular structure 258, and the boss member 252. In other examples, the components of the filter housing 220 may be formed from one or more individual pieces, which are assembled together using recognized fastening techniques (e.g., screws, bolts, welds, adhesives, etc.).

Although shown in specific form factors, one or more of the components of the filter housing 220 may take other shapes and/or configurations as necessary. Other form factors for the filter housing 220, for example, may comprise square, rectangular, and cubic form factors as desired. Likewise, the tubular structures 246, 248 may incorporate the generally cylindrical construction, as shown, as well other rounded (e.g., elliptical) and square and rectangular cross-sections, as desired.

FIG. 5 shows a side, cross-section view of the filter device 200 and, more particularly, the housing 220 taken at line 5-5 of FIG. 4. As shown in FIG. 5, the boss member 252 can have a groove 266 disposed about the periphery of the inner mating surface 256. The wall 242 includes a plurality of apertures (e.g., a first aperture 268, a second aperture 270, and a third aperture 272). The apertures 268, 270, 272 penetrate through the material of the wall 242 to expose the filter chamber 244 to the environment. In one embodiment, the first bore 254 couples with the first aperture 268 to permit visual access to the filter chamber 244. The first tubular structure 248 can have an outlet bore 274 in flow connection with the second aperture 270. The outlet bore 274 can extend from a first end 276 of the first tubular structure 246 that secures to the wall 242 to a second end 278 of the tubular structure that terminates at the mounting interface 250. The second tubular structure 248 has a valve bore structure 280 in flow connection with the third aperture 272. The valve bore structure 280 can have a series of bore features that are configured to receive and to support a valve assembly (e.g., valve assembly 234 of FIG. 3).

Figure 6:
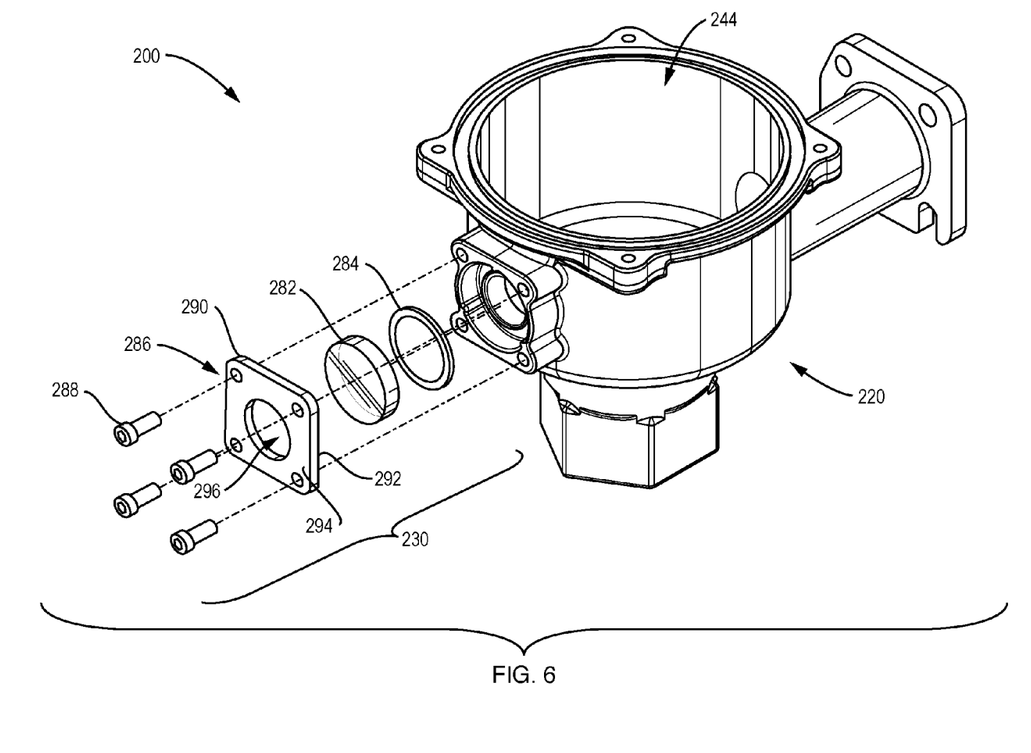
FIG. 6 depicts a perspective, exploded assembly view of the inspection element found on the filter device of FIG. 2.

FIG. 6 illustrates the filter device 200 with the filter housing 220 and the inspection element 230 shown in exploded form. In the example of FIG. 6, the inspection element 230 includes an optical element 282, a seal element 284 (e.g., an o-ring), and a retaining element 286. In one example, the inspection element 230 can include one or more fasteners 288. The retaining element 286 includes a plate 290 with a first side 292, a second side 294, and an opening 296.

The optical element 282 has optical characteristics that allow the line-of-site into the filter chamber 244. Examples of the optical element 282 may comprise materials that are optically clear and/or partially optically clear. These materials may also have mechanical properties (e.g., strength and stiffness) that are selected to withstand the pressure within the filter chamber 244 during operation of a pump unit (e.g., pump unit 218). Suitable materials include glass and polycarbonate, although this disclosure contemplates any variety of materials and compositions that comport with the visual and mechanical properties contemplated herein.

The plate 290 can be made of metal (e.g., steel, aluminum, etc.) as well as other materials that are likely not to deform under pressure of the fuel in the fuel chamber 244. Exemplary configurations for the plate 290 can include the generally square shape shown in FIG. 6. However, as discussed above, form factors for any of the component structures, including the plate 290, can vary within the scope and spirit of the present disclosure.

Figure 7:
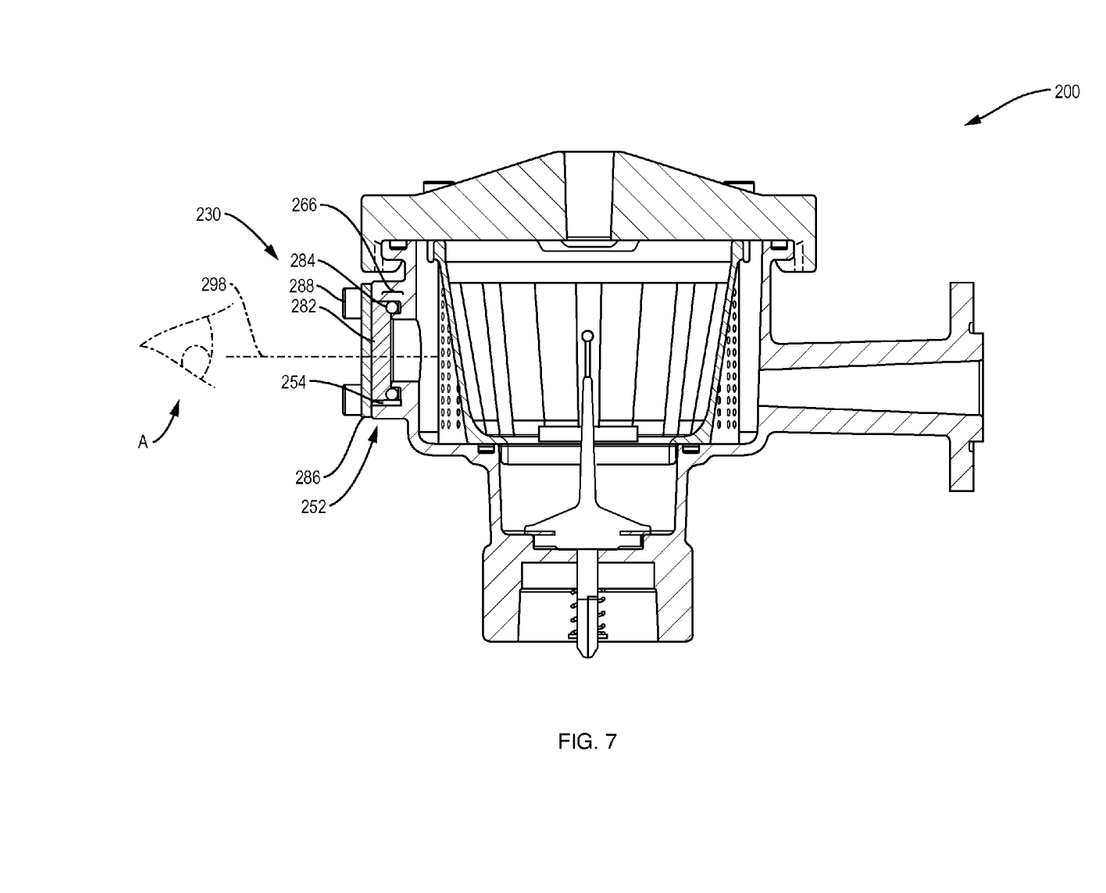
FIG. 7 depicts a side, cross-section view of the filter device of FIG. 2.

Turning now to FIG. 7, this figure illustrates a side, cross-section view of the filter device 200 taken at line 7-7 of FIG. 2. In the example of FIG. 4, construction of the filter device 200 forms a line-of-sight 298, which passes through the filter housing 220 and the inspection element 230. The line-of-sight 298 allows an end user (shown generally and identified with the letter A) to observe the interior of the filter housing 220.

In one implementation, assembly of the filter device 200 positions at least a portion of the seal element 284 in the groove 266. The optical element 282 slides into the bore 254 and, in one example, contacts one or more standoff elements (e.g., standoff elements 260 of FIG. 4). The optical element 282 can contact the seal element 284, thereby forming a fluid-tight seal about the peripheral edge of the optical element 282. The retaining element 286 mates with the exposed surface of the optical element 282. In one example, the first surface 292 (FIG. 6) of the plate 290 (FIG. 6) contact the optical element 282 and the boss member 252. Fasteners 288 engage openings (e.g., openings 264 of FIG. 4) to secure the plate 290 (FIG. 6) in position and to position the opening 296 (FIG. 6) to expose a portion of the optical element 282.

Other embodiment of the filter device can couple with pipes, e.g., pipes that carry fuel in a fuel dispensing system (e.g., system 102 of FIG. 1) and dispenser (e.g., fuel dispenser 106 of FIG. 1). These filter devices can utilize the inspection elements of the present disclosure (e.g., inspection elements 230) to expose the interior of a housing for visual inspection of fuel found therein. These embodiments can couple in-line with a fuel line found throughout fuel dispensing systems contemplated herein. Examples of the fuel line can couple with a pump unit, filter device, and/or other components of the fuel dispensing system and fuel dispenser, examples of which are disclosed herein.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A filter device for a pump unit, comprising:
    a cylindrical body comprising a bottom and a wall coupled with the bottom, the wall circumscribing a center axis to form a filter chamber having an inner volume having a filter removably and replaceably disposed therein, the wall having a first aperture and having a second aperture allowing ingress and egress into the filter chamber from outside of the wall;
    a first tubular structure disposed on the wall and aligned with the second aperture, the first tubular structure having a first bore that extends from a first end of the first tubular structure that secures to the wall to a second end of the tubular structure that secures the cylindrical body on a suction side of the pump unit; and
    an inspection element disposed in position to seal the first aperture, the inspection element comprising an optical element that forms a line of sight to the inner volume through the first aperture;

wherein when the filter is not disposed in inner volume, the line of sight extends to the first tubular structure through the second aperture; and wherein when the filter is disposed in the inner volume, the line of sight does not extend to the first tubular structure through the second aperture due to presence of the filter.

2. The filter device of claim 1, further comprising a second tubular structure aligned with a third aperture on the bottom of the cylindrical body, the second tubular structure extending axially from the bottom in a direction along the center axis, the second tubular structure having a second bore that permits fluid to enter the filter chamber.

3. The filter device of claim 1, further comprising a valve disposed in the first bore to regulate a flow of fluid into the inner volume.

4. The filter device of claim 1, wherein the inspection element comprises a seal element that mates with the wall and with the optical element, the seal element circumscribing the first aperture.

5. The filter device of claim 1, wherein the wall forms a boss member with a bore that receives at least a portion of the optical element.

6. The filter device of claim 5, wherein the inspection element comprises a retaining element with a plate that has a first surface, a second surface, and an opening, and wherein the first surface mates with the boss member to position the opening to expose a portion of the optical element.

7. The filter device of claim 1, wherein the first aperture and the second aperture have, respectively, a first position and a second position on the wall, and wherein the first position is diametrically opposite of the second position.

8. The filter device of claim 1, wherein the tubular structure terminates at a mounting plate that mates with the pump unit.

9. The filter device of claim 1, wherein the first tubular structure and the inspection element are non-removable from the cylindrical body.

* * * * *